United States Patent
Zhang et al.

(10) Patent No.: US 12,145,409 B2
(45) Date of Patent: Nov. 19, 2024

(54) METHOD FOR MONITORING MOTION STATUS OF VEHICLE AND RELATED CHIP, AND SYSTEM

(71) Applicant: Autochips Wuhan Co., Ltd., Wuhan (CN)

(72) Inventors: Tao Zhang, Wuhan (CN); Senlin Li, Wuhan (CN)

(73) Assignee: AUTOCHIPS WUHAN CO., LTD., Wuhan (CN)

( * ) Notice: Subject to any disclaimer, the term of this patent is extended or adjusted under 35 U.S.C. 154(b) by 605 days.

(21) Appl. No.: 17/399,048

(22) Filed: Aug. 11, 2021

(65) Prior Publication Data
US 2022/0242176 A1    Aug. 4, 2022

(30) Foreign Application Priority Data

Feb. 4, 2021    (CN) .......................... 202110157186.1

(51) Int. Cl.
*B60C 23/04*    (2006.01)
(52) U.S. Cl.
CPC ...... *B60C 23/0488* (2013.01); *B60C 23/0433* (2013.01)
(58) Field of Classification Search
CPC .................. B60C 23/0488; B60C 23/0433
USPC ...................................................... 701/29.4
See application file for complete search history.

(56) References Cited

U.S. PATENT DOCUMENTS

| | | | |
|---|---|---|---|
| 2005/0179530 A1 | 8/2005 | Stewart et al. | |
| 2008/0030314 A1 | 2/2008 | Watabe | |
| 2009/0093993 A1 | 4/2009 | Maitlen | |
| 2011/0082663 A1* | 4/2011 | Geisler | G01P 13/04 702/145 |
| 2011/0132081 A1* | 6/2011 | Lee | B60C 23/0416 73/146.5 |
| 2014/0195107 A1 | 7/2014 | Park et al. | |

(Continued)

FOREIGN PATENT DOCUMENTS

| | | |
|---|---|---|
| CN | 101118196 A | 2/2008 |
| CN | 107175994 A | 9/2017 |

(Continued)

OTHER PUBLICATIONS

European search report, European Application No. 21194681.9, mailed Jan. 21, 2022 (7 pages).

(Continued)

*Primary Examiner* — Mahmoud S Ismail

(57) ABSTRACT

The present disclosure provides a method for monitoring a motion status of a vehicle, a related chip, and a system. The method includes: obtaining N acceleration values in a first axial direction collected from N times sampling and a maximum acceleration change value within a preset time period; and obtaining N acceleration values in a second axial direction collected from N times sampling and a maximum acceleration change value within the preset time period; determining whether the vehicle is in motion or in a first stationary state based on the acceleration values in the first and second axial direction; and in response to the vehicle being in the first stationary state, further determining whether the vehicle is in motion or in a second stationary state based on the maximum acceleration change values in the first and second axial direction.

20 Claims, 8 Drawing Sheets

(56) References Cited

U.S. PATENT DOCUMENTS

2014/0365072 A1   12/2014  Park et al.
2019/0143987 A1    5/2019  Sekizawa et al.
2021/0049445 A1*  2/2021  Bielby ................ B60C 23/0488

FOREIGN PATENT DOCUMENTS

| CN | 109001488 A | 12/2018 |
| CN | 109017167 A | 12/2018 |
| CN | 111547060 A | 8/2020 |
| DE | 102006043505 A1 | 11/2007 |
| TW | 201623038 A | 7/2016 |

OTHER PUBLICATIONS

Notice of the first examination of Taiwan, China, Application No. 110132689, mailed Feb. 14, 2022 (21 pages).
Computer Technology and Development, Issue 05; May 10, 2013; Wang Yu; Chen Changjia; Dong Yanlei;, Research on vehicle anti-theft technology based on acceleration sensors; Full text, 1-10.
Notification to Grant Patent Right for Invention, Chinese Application No. 202110157186.1, mailed Aug. 30, 2023 (7 pages).

* cited by examiner

METHOD FOR MONITORING MOTION STATUS OF VEHICLE AND RELATED CHIP, AND SYSTEM

CROSS-REFERENCE TO RELATED APPLICATIONS

The present application claims foreign priority of Chinese Patent Application No. 202110157186.1, filed on Feb. 4, 2021, in the China National Intellectual Property Administration, the entire content of which is hereby incorporated by reference in its entirety.

TECHNICAL FIELD

The present disclosure relates to the field of vehicle electronics, and in particular, to a method for monitoring a motion status of a vehicle and a related chip, and a system.

BACKGROUND

According to statistics, on domestic highways, traffic accidents caused by wheels account for 70% of total traffic accidents, and traffic accidents caused by flat wheels account for more than 42% of total traffic accidents. In the United States, a ratio of these traffic accidents to the total traffic accidents is even higher, the U.S. Code of Federal Regulations require any car released after November of 2003 to have a wheel pressure monitoring system as a standard configuration. In recent years, Chinese government has paid great attention to the traffic accidents caused by wheels. In 2020, mandatory configuration regulations are applied in China, including any passenger car in production is required to be configured with a direct or an indirect tire pressure monitoring system (hereinafter referred to as TPMS).

TPMS generally has two working modes: a sleep mode and a normal working mode. Usually, TPMS will collect tire pressure data and send the data in the normal working mode, and then enter the sleep mode after completion to wait for a next data collection. The current of the normal working mode will be much greater than that of the sleep mode, therefore the larger the proportion of sleep mode to normal working mode, the less the power consumption will be. Since the TPMS is powered by a battery, the whole system must work in a low-power mode as much as possible to reduce battery consumption. To achieve this purpose, the TPMS is required to determine whether the vehicle is in a motion or stationary state to configure the duration of the sleep mode.

SUMMARY OF THE DISCLOSURE

The present disclosure provides a method for monitoring a motion status of a vehicle and a related chip, and a system to monitor the motion status of the vehicle.

To solve the above problem, in a first aspect, the present disclosure provides a method for monitoring a motion status of a vehicle, including: obtaining N acceleration values in a first axial direction collected from N times sampling within a preset time period through an accelerometer mounted on a wheel; and obtaining a maximum acceleration change value in the first axial direction based on the N acceleration values in the first axial direction; obtaining N acceleration values in a second axial direction collected from N times sampling within the preset time period through the accelerometer mounted on the wheel; and obtaining a maximum acceleration change value in the second axial direction based on the N acceleration values in the second axial direction; wherein the first axial direction is perpendicular to the second axial direction; determining whether the vehicle is in motion or in a first stationary state based on the N acceleration values in the first axial direction and the N acceleration values in the second axial direction; and in response to the vehicle being determined to be in the first stationary state, further determining whether the vehicle is in motion or in a second stationary state based on the maximum acceleration change value in the first axial direction and the maximum acceleration change value in the second axial direction.

To solve the above problem, in a second aspect, the present disclosure provides a tire pressure monitoring chip, including: a pressure sensor, configured to detect and obtain pressure data of a tire on a wheel; an accelerometer, configured to output an acceleration value in a first axial direction and an acceleration value in a second axial direction with a movement of the vehicle; a radio frequency transmitter, configured to send the pressure data to a vehicle processor; a controller, coupled to the pressure sensor, the accelerometer and the radio frequency transmitter respectively and configured to monitor a motion status of the vehicle and control the radio frequency transmitter to transmit the pressure data of the tire according to the motion status of the vehicle; wherein the controller achieves monitoring the motion status of the vehicle by the method in the first aspect.

To solve the above problem, in a third aspect, the present disclosure provides a system for monitoring a motion status of a vehicle including an accelerometer and a processor coupled to each other; wherein the accelerometer is configured to detect an acceleration value in a first axial direction and an acceleration value in a second axial direction of a tire of the vehicle, the first axial direction being perpendicular to the second axial direction; the processor is configured to achieve monitoring the motion status of the vehicle by the method in the first aspect.

The beneficial effect of the present disclosure is that, in contrast to the prior art, the method for monitoring a motion status of a vehicle includes: obtaining N acceleration values in a first axial direction collected from N times sampling and a maximum acceleration change value in the first axial direction within a preset time period through an accelerometer mounted on a wheel; and obtaining N acceleration values in a second axial direction collected from N times sampling and a maximum acceleration change value in the second axial direction within the preset time period through the accelerometer mounted on the wheel; wherein the first axial direction is perpendicular to the second axial direction; determining whether the vehicle is in motion or at rest based on the acceleration values in the first axial direction and the acceleration values in the second axial direction; and in response to the vehicle being determined to be at rest, further determining whether the vehicle is in motion or at rest based on the maximum acceleration change value in the first axial direction and the maximum acceleration change value in the second axial direction. It is understood that by determining whether the centrifugal acceleration of the wheels exceeds a preset threshold, it is possible to determine whether the vehicle is in motion or at rest. Since the first axial direction and the second axial direction of the accelerometer mounted on the wheel are perpendicular to each other, the output values of the first and second axial directions of the accelerometer may be simultaneously detected to obtain the centrifugal acceleration value of the wheel, and thus the vehicle can be determined to be in motion or at rest based on the first and second axial acceleration values. In addition, during the movement of the vehicle, both the centrifugal acceleration and the tangential acceleration of the tire will produce a large relative acceleration value change. While during the stopping of the vehicle, both the centrifugal acceleration and the tangential acceleration of the tire basically do not produce a change in relative acceleration values. The centrifugal and tangential accelerations of the tires are perpendicular to each other, and the first and second axes of the accelerometers mounted on the wheels are also perpendicular to each other, the first and second axes are also perpendicular to each other. Therefore, by simultaneously detecting the change in the output values of the first and second axial directions of the accelerometer, i.e., by obtaining the maximum acceleration change values in the first and second axial directions of the accelerometer over a period of time, when either of the maximum acceleration change values exceeds the first preset threshold, indicating that at least one of the centrifugal and tangential accelerations of the tire has produced a large relative acceleration value change, the vehicle may be determined to be in motion. The method does not require that the first and second axial directions of the accelerometer on the wheel correspond directly to the direction of the centrifugal acceleration and the direction of the tangential acceleration of the tire, so it is possible to monitor the motion of different vehicles. In addition, the acceleration change values of the sensors are compared without the need to analyze the specific values, thus reducing the accuracy requirements of the accelerometer.

DETAILED DESCRIPTION

Technical solutions of embodiments of the present disclosure will be illustrated in detail by reference to the accompanying drawings.

In order to illustrate, but not to limit, the present disclosure, the following description provides details, such as specific systemic structures, interfaces, technologies, and so on, to comprehensively understand the present disclosure.

The terms "system" and "network" may often be used interchangeably throughout the present disclosure. The term "and/or" in the present disclosure is used to describe association relationship between associated objects, indicating that three relationships may be available. For example, A and/or B may indicate: presence of A alone, presence of both A and B, and presence of B alone. In addition, the character "I" in the present disclosure may indicate the relationship between the object in front of "/" and the associated object after "I" is an "or" relationship. In addition, "plurality of" in the present disclosure may indicate two or more than two.

Figure 1:
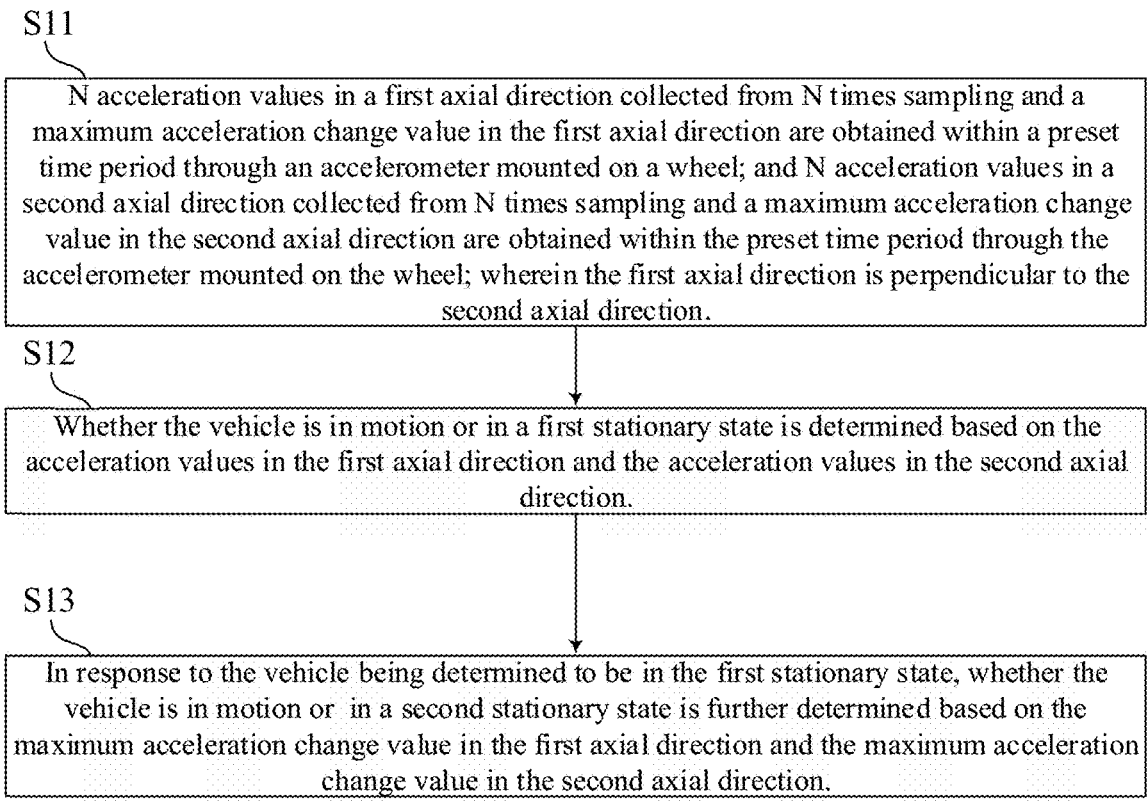
FIG. 1 is a flowchart of a method for monitoring a motion status of a vehicle according to an embodiment of the present disclosure.

FIG. 1 is a flowchart of a method for monitoring a motion status of a vehicle according to an embodiment of the present disclosure. Specifically, the method may include operations at blocks as followed.

At block S11: N acceleration values in a first axial direction collected from N times sampling and a maximum acceleration change value in the first axial direction are obtained within a preset time period through an accelerometer mounted on a wheel; and N acceleration values in a second axial direction collected from N times sampling and a maximum acceleration change value in the second axial direction are obtained within the preset time period through the accelerometer mounted on the wheel; wherein the first axial direction is perpendicular to the second axial direction.

At block S12: Whether the vehicle is in motion or in a first stationary state is determined based on the acceleration values in the first axial direction and the acceleration values in the second axial direction.

At block S13: In response to the vehicle being determined to be in the first stationary state, whether the vehicle is in motion or in a second stationary state is further determined based on the maximum acceleration change value in the first axial direction and the maximum acceleration change value in the second axial direction.

The accelerometer is mounted on the wheel and rotates with the wheel, therefore the accelerometer is subjected to a centrifugal force during rotation. The centrifugal force is an inertial force that has a radial outward direction. The centrifugal force F can be expressed as $F=m*r*\omega^2$, where m is a mass, r is a wheel radius, and $\omega$ is an angular rate of the accelerometer. Therefore, the accelerometer can obtain the centrifugal acceleration g of the wheel, $g=r*\omega^2=A*r\times v^2$, where A is a constant that depends on the type of wheel and the position of the accelerometer mounted on the wheel. Therefore, the centrifugal acceleration g is related to the running speed v of the vehicle. That is, the motion status of the vehicle may be determined based on the centrifugal acceleration g obtained by the accelerometer.

Of course, in practice, there is an accuracy tolerance of the accelerometer. Therefore, whether the centrifugal acceleration detected by the accelerometer exceeds a preset threshold may be determined to determine whether the vehicle is in motion or at rest. Since the first axial direction and the second axial direction of the accelerometer mounted on the wheel are perpendicular to each other, the output values of the first and second axial directions of the accelerometer may be simultaneously detected to obtain the centrifugal acceleration value of the wheel, and thus the vehicle can be determined to be in motion or at rest based on the first and second axial acceleration values.

Generally, whether the centrifugal acceleration of the wheels detected by the accelerometer exceeds the preset threshold may be determined to determine whether the vehicle is in motion or at rest. However, the detection accuracy of the accelerometer is usually affected by errors in the accelerometer due to factors such as temperature characteristics and aging, and the acceleration detected by the accelerometer can deviate from the actual value due to the errors. In this way, it is difficult to properly predetermine the threshold value of acceleration to determine the motion status of the vehicle. Therefore, whether the vehicle is in motion or at rest may not be accurately determined when the vehicle is running at a low speed. For example, in cases that the preset threshold value is configured low to detect the motion status of the vehicle, it may occur that the vehicle is actually at rest, but the detected acceleration value is greater than the preset threshold value due to the detection error of the accelerometer, then the vehicle is misjudged to be in motion. For another example, in cases that the preset threshold value is configured high, the vehicle may be misjudged to be at rest when it is actually running at a low speed.

Figure 2A:
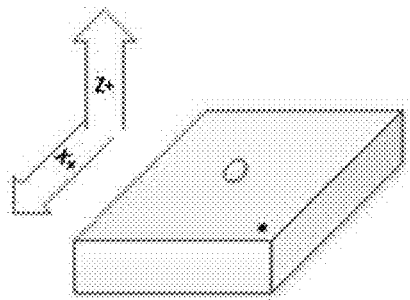
FIG. 2a is a schematic view of an acceleration direction detected by an accelerometer.
Figure 2B:
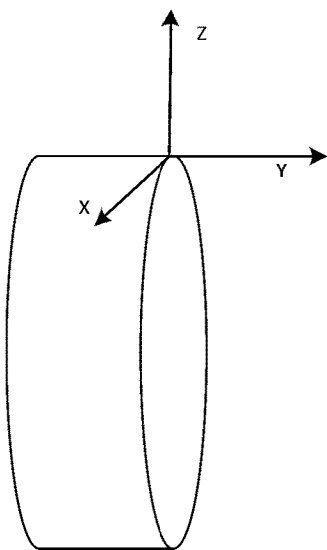
FIG. 2b is a schematic view of an acceleration direction of a tire.
Figure 2C:
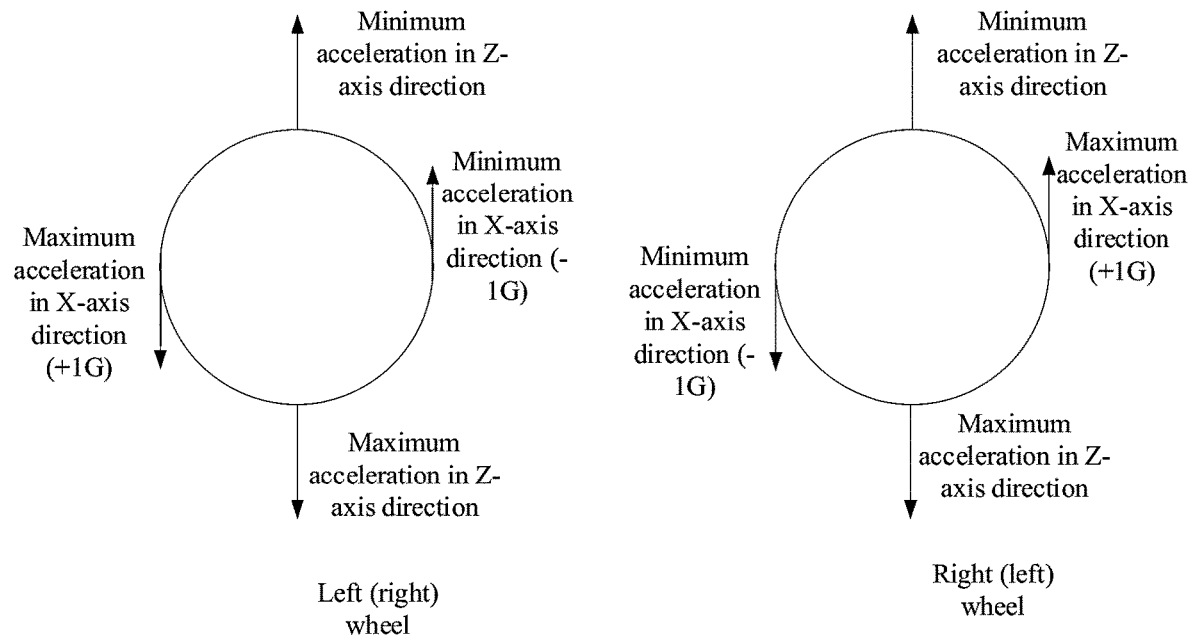
FIG. 2c is a schematic view of a relationship between the magnitudes of acceleration during a rotation of tires.

FIG. 2a is a schematic view of an acceleration direction detected by an accelerometer, FIG. 2b is a schematic view of an acceleration direction of a tire, and FIG. 2c is a schematic view of a relationship between the magnitudes of acceleration during a rotation of tires. As shown in FIG. 2a, it can be specified to the accelerometer that the Z-axis direction of the accelerometer chip is an up-down direction, and the X-axis direction of the accelerometer chip is a length direction. As shown in FIG. 2b, it can be specified that the direction of the centrifugal force of the tire is the Z-axis direction when the tire is in motion, a tangential direction of a moving surface of the tire is the X-axis direction, and the vertical direction of the tire, which is orthogonal to both the Z-axis and X-axis, is the Y-axis direction. Since the rotation direction of the left and right wheels is opposite when viewed from a point of view of the driver during rotation, one wheel rotates clockwise and the other counterclockwise. Therefore, the acceleration of the tire in the Z-axis direction and the acceleration in the X-axis direction during motion have the magnitude relationship as shown in FIG. 2c. It is understood that when the vehicle is in forward motion, the left view in FIG. 2c is a schematic view of the magnitude relationship of the acceleration during the rotation of the tire of the left wheel, and the right view in FIG. 2c is a schematic view of the magnitude relationship of the acceleration during the rotation of the tire of the right wheel. While when the vehicle is in reverse motion, it is just the opposite, i.e., the left view is a schematic view of the magnitude relationship of the acceleration during the rotation of the tire of the right wheel, and the right view is a schematic view of the magnitude relationship of the acceleration during rotation of the tire of the left wheel. The present disclosure is illustrated with an example when the vehicle is in forward motion. Specifically, during one rotation of the left wheel, the acceleration in the X-axis direction reaches the maximum value, the acceleration in the Z-axis direction reaches the maximum value, the acceleration in the X-axis direction reaches the minimum value, and the acceleration in the Z-axis direction reaches the minimum value, which occur in sequence. While during one rotation of the right wheel, the acceleration in the Z-axis direction reaches the maximum value, the acceleration in the X-axis direction reaches the maximum value, the acceleration in the Z-axis direction reaches the minimum value, and the acceleration in the X-axis direction reaches the minimum value, which occur in sequence.

Therefore, it is understood that in cases that the positive Z-axis direction of the accelerometer chip corresponds to the positive Z-axis direction of the tire and the positive X-axis direction of the accelerometer chip corresponds to the positive X-axis direction or the negative X-axis direction of the tire, the Z-axis direction of the accelerometer chip can detect the centrifugal acceleration of the tire, (i.e., the Z-axis direction of the accelerometer chip detects the acceleration in the Z-axis direction of the tire), while the X-axis direction of the accelerometer chip can detect the tangential acceleration of the wheel, (i.e., the X-axis direction of the accelerometer chip detects the acceleration in the tire X-axis direction of the tire). Thus, when the vehicle is in uniform motion, the Z-axis direction of the accelerometer chip will output an acceleration value greater than 1 g, the X-axis direction of the accelerometer chip will output an acceleration value between −1 g and +1 g, a maximum change between the acceleration values output by the Z-axis direction of the accelerometer chip will be greater than or equal to 2 g, and a maximum change between the acceleration values output by the X-axis direction of the accelerometer chip will be greater than or equal to 2 g. When the vehicle is at rest, the X-axis direction and the Z-axis direction of the accelerometer chip will output acceleration values less than 1 g, a change between the acceleration values output by the Z-axis direction of the accelerometer chip will be less than 0.1 g, and a change between the acceleration values output by the X-axis direction of the accelerometer chip will be less than 0.1 g. Therefore, whether the change value between the acceleration values output by the Z-axis direction of the accelerometer chip is less than the preset threshold may be determined, or whether the change value between the acceleration values output by the X-axis direction of the accelerometer chip is less than the preset threshold may be determined. For example, the preset threshold may be configured to be 0.3 g, as long as at least one of the change values is not less than 0.3 g, the vehicle can be determined to be in motion currently.

Figure 3:
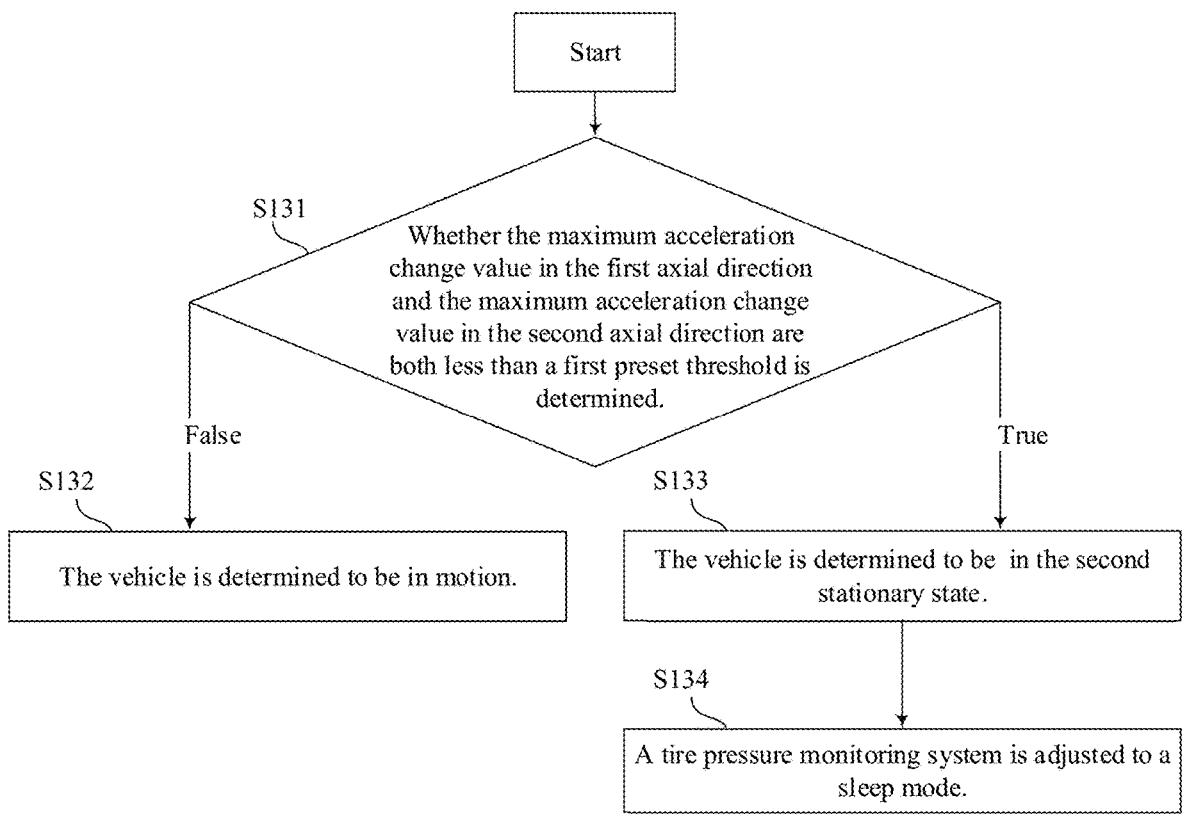
FIG. 3 is a flowchart of the operation S13 shown in FIG. 1 according to an embodiment of the present disclosure.

It can be understood that the acceleration in the Z-axis direction and the acceleration in the X-axis direction of the tire can be expressed by the acceleration value in the Z-axis direction and the acceleration value in the X-axis direction outputted during the detection of the accelerometer. The acceleration in the Z-axis direction and the acceleration in the X-axis direction of the tire change with the movement of the vehicle. During the movement of the vehicle, both the centrifugal acceleration and the tangential acceleration of the tire will produce a large relative acceleration value change. While when the vehicle is at rest, both the centrifugal acceleration and the tangential acceleration of the tire basically do not produce a change in relative acceleration values. FIG. 3 is a flowchart of the operation S13 shown in FIG. 1 according to an embodiment of the present disclosure. In some embodiments, the above operation S13 may specifically include operations at blocks as followed.

At block S131: Whether the maximum acceleration change value in the first axial direction and the maximum acceleration change value in the second axial direction are both less than a first preset threshold is determined; in response to the maximum acceleration change value in the first axial direction and the maximum acceleration change value in the second axial direction being not both less than the first preset threshold, an operation S132 is performed; and in response to the maximum acceleration change value in the first axial direction and the maximum acceleration change value in the second axial direction being both less than the first preset threshold, an operation S133 is performed.

At block S132: The vehicle is determined to be in motion.

At block S133: The vehicle is determined to be in the second stationary state.

It is understood that by simultaneously detecting the change in the output values of the first and second axial directions of the accelerometer, i.e., by obtaining the maximum acceleration change values in the first and second axial directions of the accelerometer over a period of time, when either of the maximum acceleration change values exceeds the first preset threshold, indicating that at least one of the centrifugal and tangential accelerations of the tire has produced a large relative acceleration value change, the vehicle may be determined to be in motion. The method does not require that the first and second axial directions of the accelerometer on the wheel correspond directly to the direction of the centrifugal acceleration and the direction of the tangential acceleration of the tire, so it is possible to monitor the motion of different vehicles. In addition, the acceleration change values of the sensors are compared without the need to analyze the specific values, thus reducing the accuracy requirements of the accelerometer.

Further, after the operation S133, the method may also include an operation S134.

At block S134: A tire pressure monitoring system is adjusted to a sleep mode.

It is understood that since the tire pressure monitoring system is powered by a battery, the entire tire pressure monitoring system is required to work in a low power mode to reduce the battery consumption as much as possible. Thus, based on the maximum acceleration change value in the first axial direction and the maximum acceleration change value in the second axial direction of the accelerometer, whether the vehicle is in motion or at rest may be determined. The tire pressure monitoring system can choose whether to transmit a tire pressure signal according to the determined motion status of the vehicle. Specifically, when the vehicle is at rest, the tire pressure monitoring system may be adjusted to the sleep mode, such that the power consumption of the tire pressure monitoring system may be reduced.

Figure 4:
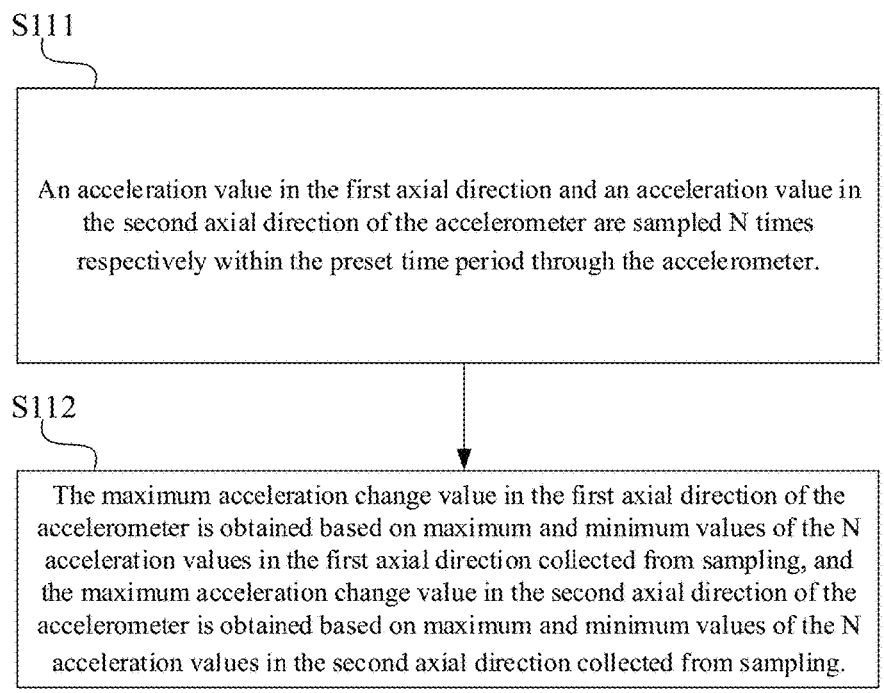
FIG. 4 is a flowchart of the operation S11 shown in FIG. 1 according to an embodiment of the present disclosure.

FIG. 4 is a flowchart of the operation S11 shown in FIG. 1 according to an embodiment of the present disclosure. In some embodiments, the operation S11 may specifically include operations at blocks as followed.

At block S111: The acceleration value in the first axial direction and the acceleration value in the second axial direction of the accelerometer are sampled N times respectively within the preset time period through the accelerometer.

At block S112: The maximum acceleration change value in the first axial direction of the accelerometer is obtained based on maximum and minimum values of the N acceleration values in the first axial direction collected from sampling, and the maximum acceleration change value in the second axial direction of the accelerometer is obtained based on maximum and minimum values of the N acceleration values in the second axial direction collected from sampling.

It is understood that the acceleration values in the first axial direction and the acceleration values in the second axial direction of the accelerometer are sampled N times respectively within the preset time period through the accelerometer, such that the N acceleration values in the first axial direction and N acceleration values in the second axial direction can be obtained. The time interval between any two adjacent samplings may be the same or different. Thus, the maximum acceleration change value in the first axial direction of the accelerometer may be obtained based on the maximum and minimum values of the N acceleration values in the first axial direction, and the maximum acceleration change value in the second axial direction of the accelerometer may be obtained based on the maximum and minimum values of the N acceleration values in the second axial direction.

Figure 5:
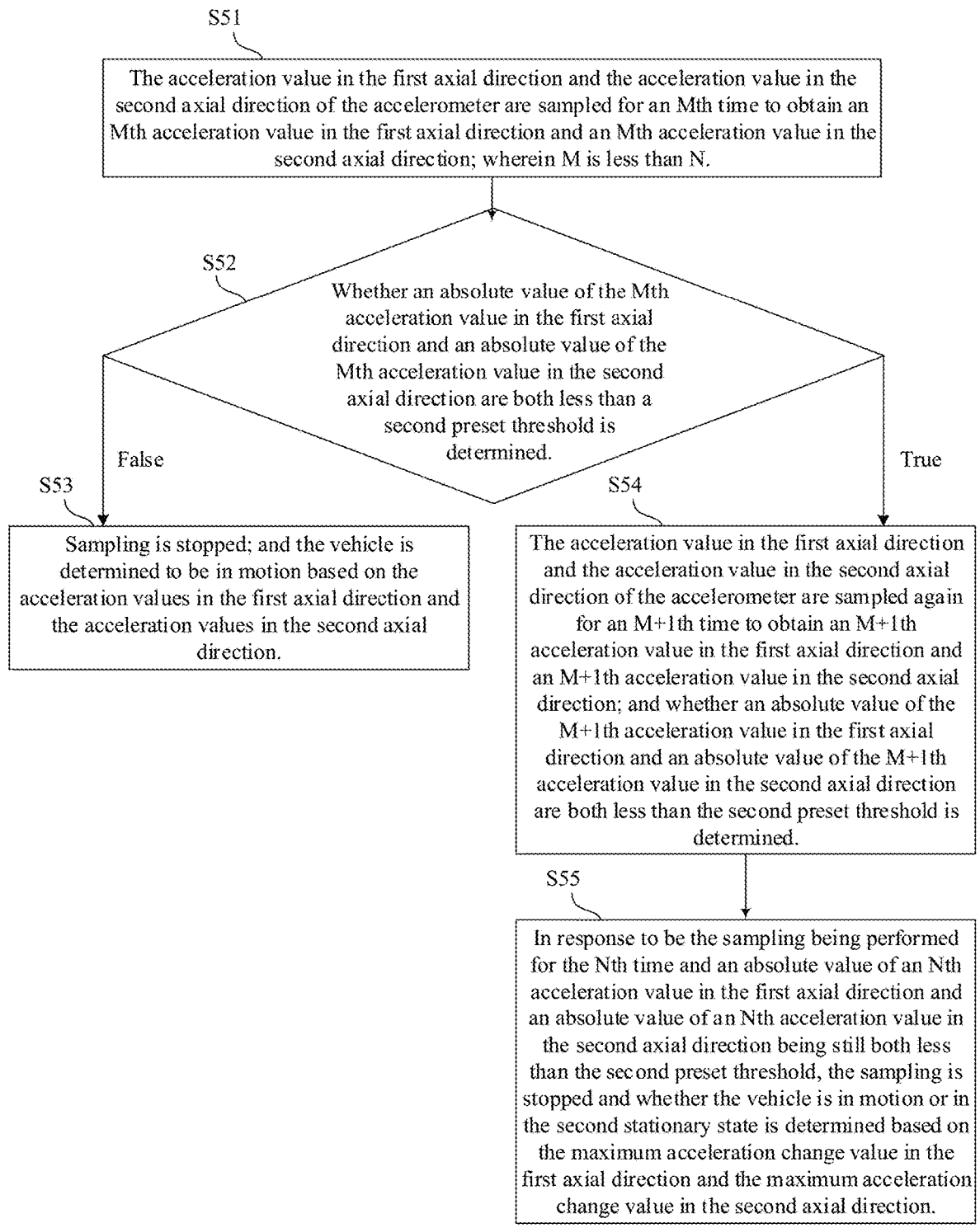
FIG. 5 is a flowchart of a method for monitoring a motion status of a vehicle according to another embodiment of the present disclosure.

FIG. 5 is a flowchart of a method for monitoring a motion status of a vehicle according to another embodiment of the present disclosure. Specifically, the method may include operations at blocks as followed.

At block S51: The acceleration value in the first axial direction and the acceleration value in the second axial direction of the accelerometer are sampled for an Mth time to obtain an Mth acceleration value in the first axial direction and an Mth acceleration value in the second axial direction; wherein M is less than N.

At block S52: Whether an absolute value of the Mth acceleration value in the first axial direction and an absolute value of the Mth acceleration value in the second axial direction are both less than a second preset threshold is determined; in response to the absolute value of the Mth acceleration value in the first axial direction and the absolute value of the Mth acceleration value in the second axial direction being not both less than the second preset threshold, an operation S53 is performed; and in response to the absolute value of the Mth acceleration value in the first axial direction and the absolute value of the Mth acceleration value in the second axial direction being both less than the second preset threshold, an operation S54 is performed.

At block S53: Sampling is stopped; and the vehicle is determined to be in motion based on the acceleration values in the first axial direction and the acceleration values in the second axial direction.

At block S54: The acceleration value in the first axial direction and the acceleration value in the second axial direction of the accelerometer are sampled again for an M+1th time to obtain an M+1th acceleration value in the first axial direction and an M+1th acceleration value in the second axial direction; and whether an absolute value of the M+1th acceleration value in the first axial direction and an absolute value of the M+1th acceleration value in the second axial direction are both less than the second preset threshold is determined.

At block S55: In response to be the sampling being performed for the Nth time and an absolute value of an Nth acceleration value in the first axial direction and an absolute value of an Nth acceleration value in the second axial direction being still both less than the second preset threshold, the sampling is stopped and whether the vehicle is in motion or in the second stationary state is determined based on the maximum acceleration change value in the first axial direction and the maximum acceleration change value in the second axial direction.

Specifically, M is a positive integer less than N. Since it can be determined whether the centrifugal acceleration of the tire detected by the accelerometer exceeds a preset threshold to determine whether the vehicle is in motion or at rest; therefore after sampling the acceleration value in the first axial direction and the acceleration value in the second axial direction of the accelerometer for the Mth time to obtain the Mth acceleration value in the first axial direction and the Mth acceleration value in the second axial direction, whether the absolute value of the Mth acceleration value in the first axial direction and the absolute value of the Mth acceleration value in the second axial direction are both less than the second preset threshold may be determined. The second preset threshold may be configured higher. When the absolute value of the Mth acceleration value in the first axial direction and the absolute value of the Mth acceleration value in the second axial direction are not both less than the second preset threshold, it is indicated that the centrifugal acceleration of the tire exceeds the preset threshold. The sampling may be stopped, and the vehicle may be determined to be in motion based on the acceleration values in the first axial direction and the acceleration values in the second axial direction. When the absolute value of the Mth acceleration value in the first axial direction and the absolute value of the Mth acceleration value in the second axial direction are both less than the second preset threshold, it cannot be indicated that the centrifugal acceleration of the tire exceeds the preset threshold, so the acceleration value in the first axial direction and the acceleration value in the second axial direction of the accelerometer are required to be sampled again. It can be understood that after each sampling, operations S51 to S54 may be performed to determine whether the vehicle is in motion or at rest. In addition, after cyclically performing the above operations S51 to S54 until the Nth time of sampling, the Nth acceleration value in the first axial direction and the Nth acceleration value in the second axial direction are obtained, and whether the absolute value of the Nth acceleration value in the first axial direction and the absolute value of the Nth acceleration value in the second axial direction are still both less than the second preset threshold is determined. In this case, it is indicated that it is not possible to determine that the vehicle is in motion based on the acceleration value in the first axial direction and the acceleration value in the second axial direction. Therefore, the sampling may be stopped, and whether the vehicle is in motion or at rest may be determined based on the maximum acceleration change value in the first axial direction and the maximum acceleration change value in the second axial direction.

It can be understood that the positive Z-axis direction of the accelerometer chip does not necessarily correspond to the positive Z-axis direction of the tire, and the positive X-axis direction of the accelerometer chip does not necessarily correspond to the positive X-axis direction or the negative X-axis direction of the tire. That is, the positive Z-axis direction and the positive X-axis direction of the accelerometer chip may present different angles to the Z-axis/X-axis/Y-axis direction of the tire. By detecting the cases of different clamping angles, the acceleration value of Z-axis direction, the acceleration value of X-axis direction, and the corresponding acceleration change value of the output during the detection of the corresponding accelerometer can be obtained. The details are shown in the following table.

| | | | IC direction corresponding to the centrifugal force direction | Absolute acceleration value | | | |
|---|---|---|---|---|---|---|---|
| | | | | Z-axis acceleration | | X-axis acceleration | |
| | Corresponding to tire direction | | | At | | At | |
| Num | IC Z+ | IC X+ | | In motion | rest | In motion | rest |
| 1 | Z+/Z− | X−/X+ | Z | >±1 g | <±1 g | <±1 g | <±1 g |
| 2 | Z+/Z− | X/Y 夹角 | Z | >±1 g | <±1 g | <=±1 g | <=±1 g |
| 3 | Z+/Z− | Y+/Y− | Z | >±1 g | <±1 g | Turning >0.1 g | <0.1 g |
| 4 | Y−/Y+ | Z+/Z− | X | Turning >0.1 g | <0.1 g | >±1 g | <±1 g |
| 5 | Y−/Y+ | X+/X− | Y | Turning >0.1 g | <0.1 g | <±1 g | <±1 g |
| 6 | Y−/Y+ | Z/X angle | X/Y angle | Turning >0.1 g | <0.1 g | >±0.1 g | <0.1 g |
| 7 | Z/Y angle | X−/X+ | Z/Y angle | >±1 g | <±1 g | <±1 g | <±1 g |
| 8 | Z/Y angle | Z/X angle | X/Z/Y angle | >±1 g | <±1 g | >±1 g | <±1 g |

| | Acceleration change value | | | | | | Basis for determining that the vehicle is in motion |
|---|---|---|---|---|---|---|---|
| | Z-axis acceleration | | | X-axis acceleration | | | |
| Num | In motion | Uniform speed | At rest | In motion | Uniform speed | At rest | -Meet any of the conditions |
| 1 | >=2 g | <=2 g | <0.1g | >=2 g | <=2 g | <0.1 g | Z-axis greater than threshold; Z-axis change >0.3 g; X-axis change >0.3 g |
| 2 | >=2 g | <=2 g | <0.1 g | <=2 g | <=2 g | <0.1 g | Z-axis greater than threshold; Z-axis change > 0.3g |
| 3 | >=2 g | <=2 g | <0.1 g | Turning >0.1g | Turning >0.1 g | <0.1 g | Z-axis greater than threshold; Z-axis change > 0.3g |
| 4 | Turning >0.1 g | Turning >0.1 g | <0.1 g | >=2 g | <=2 g | <0.1g | X-axis greater than threshold; X-axis change >0.3g |

| | | | | | | | |
|---|---|---|---|---|---|---|---|
| 5 | Turning >0.1 g | Turning >0.1 g | <0.1 g | >=2 g | <=2 g | <0.1 g | X-axis change >0.3g |
| 6 | Turning >0.1 g | Turning >0.1 g | <0.1 g | >0.5 g | >0.5 g | <0.1 g | X-axis greater than threshold; X-axis change >0.3g |
| 7 | >0.1 g | >0.1 g | <0.1 g | >=2 g | <=2 g | <0.1 g | Z-axis greater than threshold; Z-axis change > 0.3g |
| 8 | >0.5 g | >0.5 g | <0.1 g | >0.5 g | >0.5 g | <0.1 g | Z-axis greater than threshold; Z-axis change > 0.3g; X-axis greater than threshold; X-axis change >0.3g |

No matter what angle the Z-axis positive direction and X-axis positive direction of the accelerometer chip present with the Z-axis/X-axis/Y-axis direction of the tire, it can be found that: when the car is at rest, the acceleration change value in the Z-axis direction and the acceleration change value in the X-axis direction outputted by the accelerometer during the detection process is less than 0.1 g. Therefore, by simultaneously detecting the changes of the output values of the first and second axial directions of the accelerometer, i.e., by obtaining the maximum acceleration change value in the first axial direction and the maximum acceleration change value in the second axial direction of the accelerometer over the period of time, when either of the maximum acceleration change values exceeds the first preset threshold, it can be indicated that at least one of the centrifugal acceleration and tangential acceleration of the tire has produced a large relative acceleration value change, i.e., the vehicle is considered to be in motion. This method does not require that the first and second axial directions of the accelerometer on the wheel correspond directly to the direction of the centrifugal acceleration and the direction of the tangential acceleration of the tire, respectively, such that the monitoring of motion status can be achieved for different vehicles. In addition, when the centrifugal force direction of the tire is not perpendicular to the Z-axis direction of the accelerometer chip, whether the vehicle is in motion may be determine by determining whether the acceleration value in the Z-axis direction output during the detection of the accelerometer is greater than the second preset threshold. When the centrifugal force direction of the tire is not perpendicular to the X-axis direction of the accelerometer chip, whether the vehicle is in motion may be determine by determining whether the acceleration value in the X-axis direction output during the detection of the accelerometer is greater than the second preset threshold.

Figure 6:
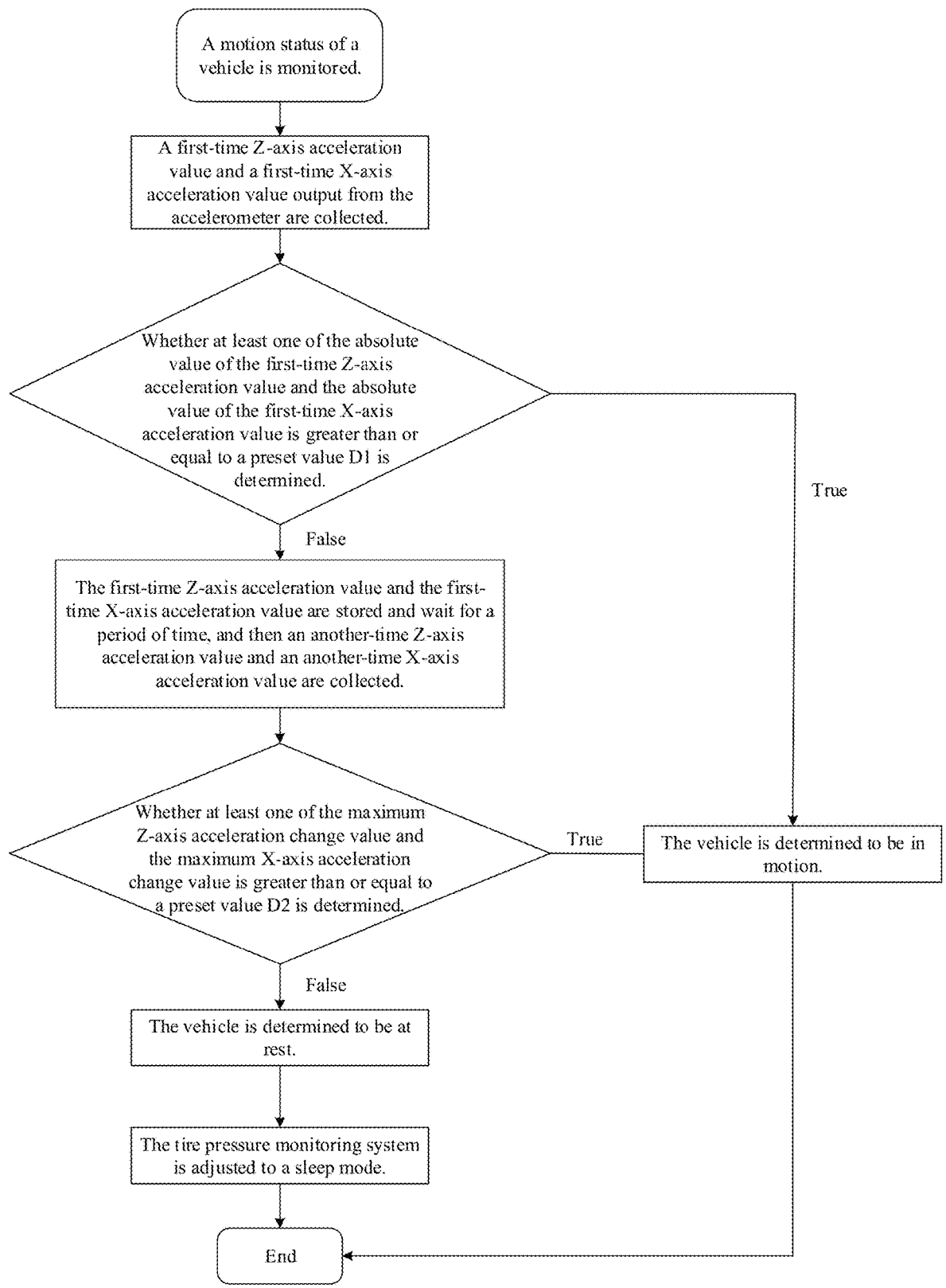
FIG. 6 is a flowchart of an application scenario of a method for monitoring a motion status of a vehicle according to an embodiment of the present disclosure.

FIG. 6 is a flowchart of an application scenario of a method for monitoring a motion status of a vehicle according to an embodiment of the present disclosure. When monitoring the motion status of the vehicle, a first-time Z-axis acceleration value and a first-time X-axis acceleration value output from the accelerometer are collected by the accelerometer, then the relationship between the absolute value of the first-time Z-axis acceleration value and a preset value D1 is determined, and the relationship between the absolute value of the first-time X-axis acceleration value and the preset value D1 is determined. The preset value D1 may be 6.5 g. When at least one of the absolute value of the first-time Z-axis acceleration value and the absolute value of the first-time X-axis acceleration value is greater than or equal to the preset value D1, the vehicle may be determined to be in motion. When the absolute value of the first-time Z-axis acceleration value and the absolute value of the first-time X-axis acceleration value are both less than the preset value D1, the first-time Z-axis acceleration value and the first-time X-axis acceleration value may be stored and wait for a period of time (usually more than 1 s), and then a second-time Z-axis acceleration value and a second-time X-axis acceleration value outputted by the accelerometer may be collected. The relationship between the absolute value of the second-time Z-axis acceleration value and the preset value D1 is determined, and the relationship between the absolute value of the second-time X-axis acceleration value and the preset value D1 is determined, such that the motion status of the vehicle may also be determined. When at least one of the absolute value of the second-time Z-axis acceleration value and the absolute value of the second X-axis acceleration value is greater than or equal to the preset value D1, the vehicle may be determined to be in motion. When the absolute value of the second-time Z-axis acceleration value and the absolute value of the second-time X-axis acceleration value are both less than the preset value D1, the second-time Z-axis acceleration value and the second-time X-axis acceleration value may be stored. Since the first-time Z-axis acceleration value and the first-time X-axis acceleration value, the second-time Z-axis acceleration value and the second-time X-axis acceleration value are stored, a Z-axis acceleration change value between the first-time Z-axis acceleration value and the second-time Z-axis acceleration value may be compared, and an X-axis acceleration change value between the first-time X-axis acceleration value and the second-time X-axis acceleration value may be compared. When at least one of the Z-axis acceleration change value and the X-axis acceleration change value is greater than or equal to a preset value D2, which may be 0.8 g, then the vehicle may be determined to be in motion. When the Z-axis acceleration change value and the X-axis acceleration change value are both less than the preset value D2, a third-time Z-axis acceleration value and a third-time X-axis acceleration value output by the accelerometer may continue to be collected. Then, a similar judgment method is performed, for each time of acquisition, the relationship between the absolute value of the Z-axis acceleration value and the preset value D1 is determined, the relationship between the absolute value of the X-axis acceleration value and the preset value D1 is determined, the relationship between a maximum acceleration change value in the Z-axis and the preset value D2 is determined, and the relationship between a maximum acceleration change value in the X-axis and the preset value D2 is determined. When at least one of the absolute value of the Z-axis acceleration value and the absolute value of the X-axis acceleration value obtained at a certain acquisition is greater than or equal to the preset value D1, or at least one of the maximum acceleration change value in the Z-axis and the maximum acceleration change value in the X-axis is greater than or equal to the preset value D2, the vehicle may be determined to be in motion, otherwise the vehicle may be determined to be at rest. It can be understood that when the vehicle is at rest, the tire pressure monitoring system may be adjusted to a sleep mode, such that the power consumption of the tire pressure monitoring system may be reduced. In the process of practical application, the collected Z-axis acceleration value and X-axis acceleration value outputted by the accelerometer may be stored by means of cyclic overwriting, such that the data storage pressure can be reduced and the real-time data availability may be ensured. The cyclic overwriting refers to N acceleration values in the first axial direction and N acceleration values in the second axial direction in a next sampling cycle overwriting the N acceleration values in the first axial direction and the N acceleration values in the second axial direction in a current sampling cycle.

Figure 7:
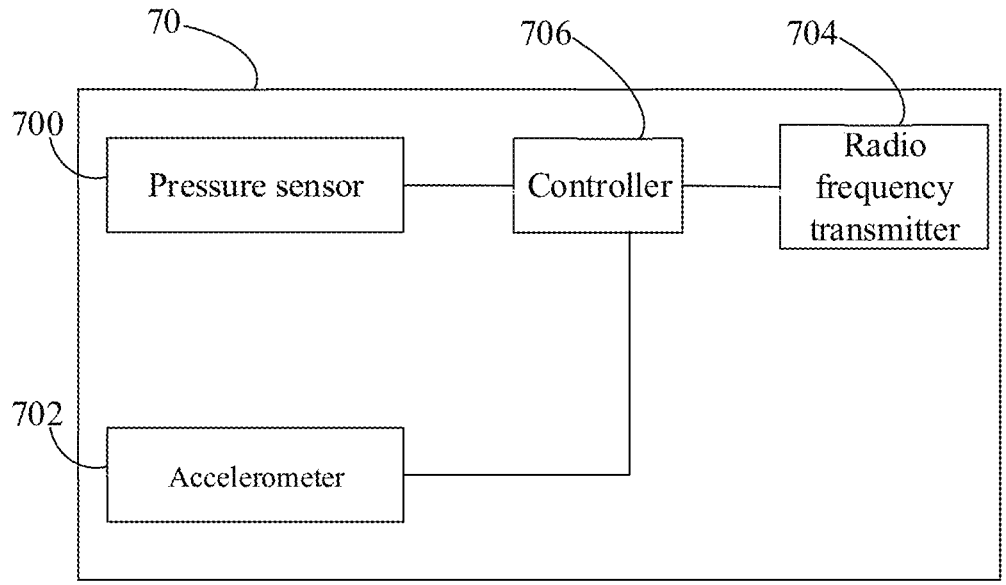
FIG. 7 is a schematic view of a framework of a tire pressure monitoring chip according to an embodiment of the present disclosure.

FIG. 7 is a schematic view of a framework of a tire pressure monitoring chip according to an embodiment of the present disclosure. The tire pressure monitoring chip 70 includes: a pressure sensor 700, configured to detect and obtain pressure data of a tire on a wheel; an accelerometer 702, configured to output an acceleration value in a first axial direction and an acceleration value in a second axial direction with vehicle movement; a radio frequency transmitter 704, configured to send the tire pressure data to a vehicle processor; a controller 706, coupled to the pressure sensor 700, the accelerometer 702 and the radio frequency transmitter 704 respectively and configured to monitor a motion status of the vehicle and control the radio frequency transmitter 704 to transmit the pressure data of the tire according to the motion status of the vehicle. The controller 706 may achieve monitoring the motion status of the vehicle by any of the above methods.

In some embodiments, the accelerometer 702 may be a dual-axis accelerometer that can detect X-axis and Z-axis acceleration, or a tri-axis accelerometer that can detect X-axis, Y-axis, and Z-axis acceleration. In other embodiments, the accelerometer 702 may also be replaced by a first accelerometer and a second accelerometer, the first accelerometer and the second accelerometer being single-axis accelerometers, the first accelerometer for detecting and outputting a first axial acceleration value, and the second accelerometer for detecting and outputting a first axial acceleration value, the first axial direction being perpendicular to the second axial direction.

Figure 8:
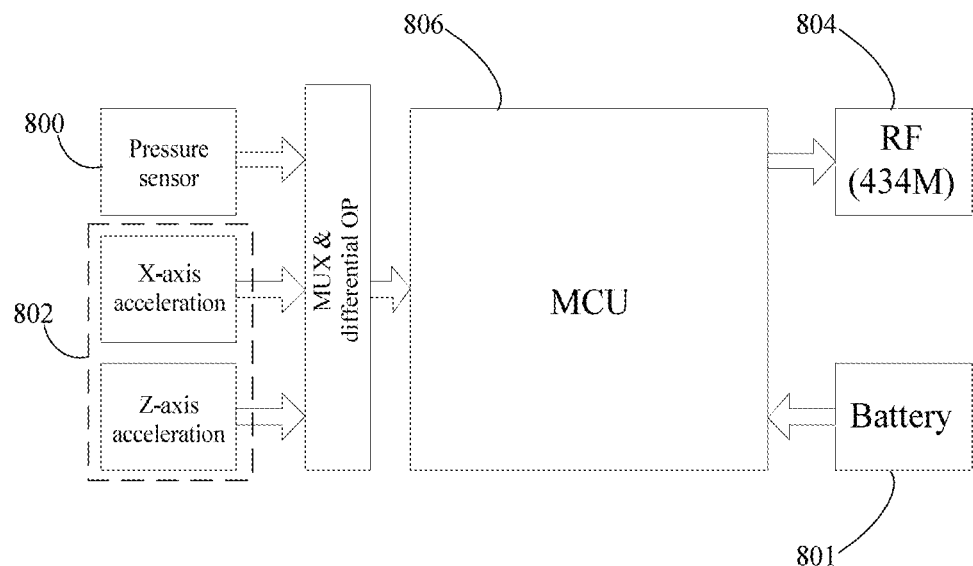
FIG. 8 is a schematic view of a framework of a tire pressure monitoring device according to an embodiment of the present disclosure.

FIG. 8 is a schematic view of a framework of a tire pressure monitoring device according to an embodiment of the present disclosure. In the embodiment, the tire pressure monitoring device 80 includes a tire pressure monitoring chip and a battery 801. The tire pressure monitoring chip may be the aforementioned tire pressure monitoring chip 70. That is, the tire pressure monitoring chip in the embodiment includes a pressure sensor 800, an accelerometer 802, a controller 806 and a radio frequency transmitter 804. Specifically, the controller 806 may be a micro control unit (MCU) powered by battery 801. The pressure sensor 800, the accelerometer 802 may be coupled to MCU through a multiplexer modulator MUX and a differential amplifier circuit, etc. The radio frequency transmitter 804 may transmit data through a 434M antenna.

For the details of the controller 806 to achieve the method for monitoring a motion status of a vehicle, reference may be made to the aforementioned embodiments, which will not be repeated here.

Figure 9:
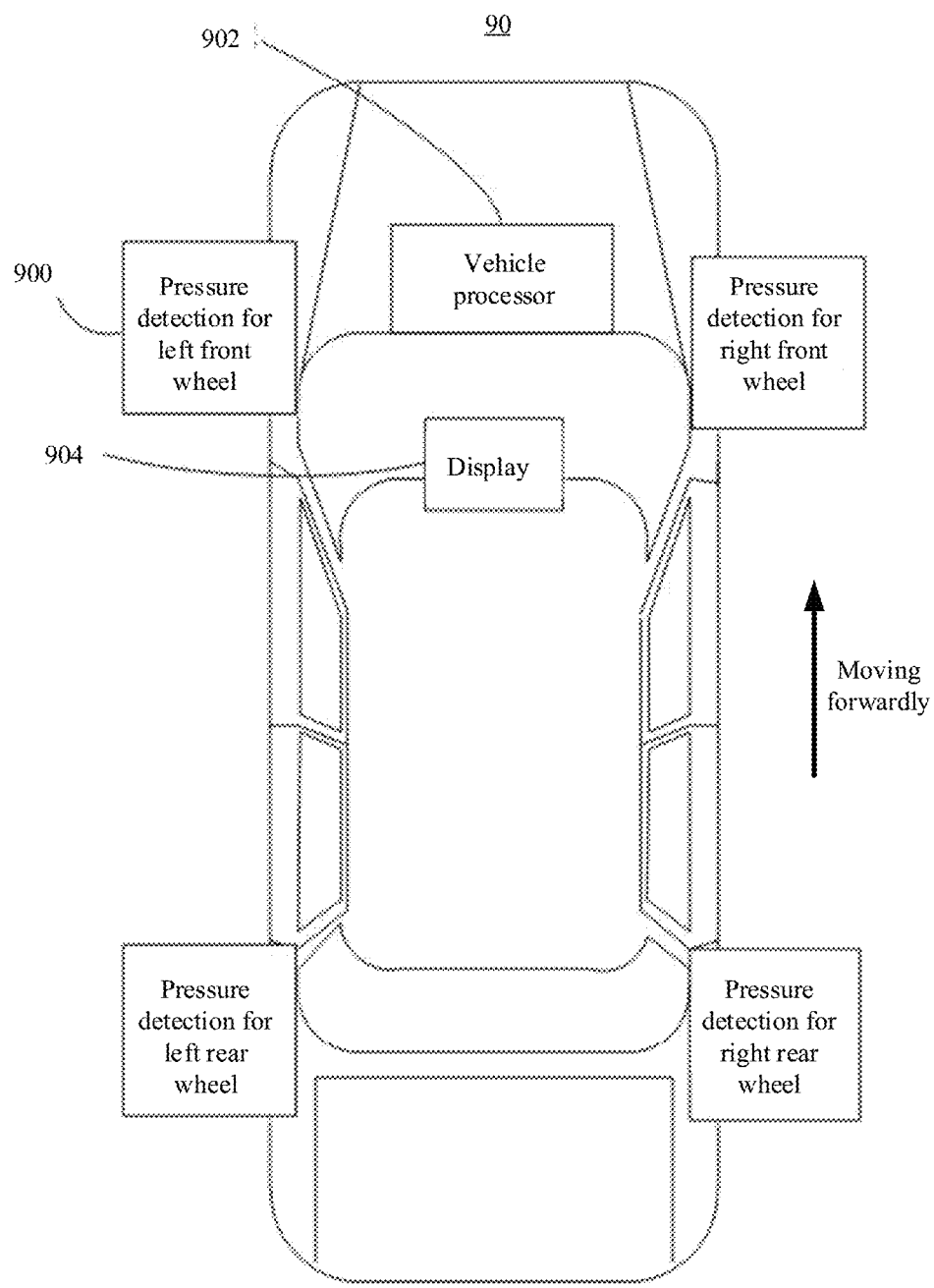
FIG. 9 is a schematic view of a framework of a tire pressure monitoring system according to an embodiment of the present disclosure.

FIG. 9 is a schematic view of a framework of a tire pressure monitoring system according to an embodiment of the present disclosure. The tire pressure monitoring system 90 includes a tire pressure monitoring device 900, a tire pressure signal receiving device (not shown), a vehicle processor 902, and a display 904 that are coupled to each other. The tire pressure monitoring device 900 is mounted on a wheel of a vehicle for detecting pressure data of a tire of the vehicle, monitoring a motion status of the vehicle, and controlling the transmission of the tire pressure data to the tire pressure signal receiving device based on the motion status of the vehicle. The vehicle processor 902 is configured to control the display 904 to display the pressure data of each tire according to the tire pressure data received by the tire pressure signal receiving device. The tire pressure monitoring device 900 may be any of the aforementioned tire pressure monitoring devices. It is understood that the tire pressure monitoring device 900 may be installed on each wheel of the vehicle.

Further, the display 904 may include a warning light corresponding to each wheel. The vehicle processor 902 may further be configured to: control the warning light corresponding to the wheel to illuminate when the wheel pressure of the wheel is not in a preset range. Specifically, the display 904 may display pressure of the left front wheel, pressure of the left rear wheel, pressure of the right front wheel and pressure of the right rear wheel. A corresponding warning light for the left front wheel, a corresponding warning light for the left rear wheel, a corresponding warning light for the right front wheel, and a corresponding warning light for the right rear wheel may be configured on the display 114. When the wheel pressure is excessively high or excessively low, the vehicle processor 902 may control the corresponding warning light of the wheel to illuminate for warning.

In detail, the vehicle processor 902 may also be referred to as a central processing unit (CPU). The vehicle processor 902 may be an integrated circuit chip having signal processing capabilities. The vehicle processor 902 may also be a general purpose processor, a digital signal processor (DSP), an application specific integrated circuit (ASIC), a field-programmable gate array (FPGA) or other programmable logic devices, a discrete gate or transistor logic device, a discrete hardware component. The general purpose processor may be a microprocessor or any conventional processor. In addition, the vehicle processor 902 may be implemented by an integrated circuit chip.

Figure 10:
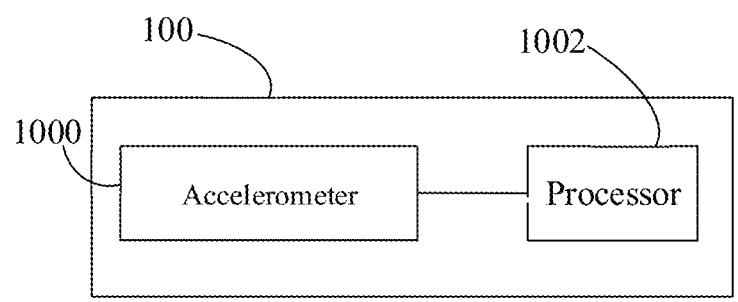
FIG. 10 is a schematic view of a system for monitoring a motion status of a vehicle according to an embodiment of the present disclosure.

FIG. 10 is a schematic view of a system for monitoring a motion status of a vehicle according to an embodiment of the present disclosure. The system for monitoring the motion status of the vehicle 100 includes an accelerometer 1000 and a processor 1002 coupled to each other. The accelerometer 1000 is configured to detect an acceleration value in a first axial direction and an acceleration value in a second axial direction of a tire of the vehicle. The first axial direction is perpendicular to the second axial direction. The processor 1002 is configured to achieve monitoring the motion status of the vehicle by any of the above methods.

In some embodiments, the accelerometer 1000 described above may be a dual-axis accelerometer that can detect X-axis and Z-axis acceleration, or may be a tri-axis accelerometer that can detect X-axis, Y-axis, and Z-axis acceleration. In other embodiments, the accelerometer 1000 may include a first accelerometer and a second accelerometer, the first accelerometer and the second accelerometer being single-axis accelerometers, the first accelerometer being configured to detect and output the acceleration value in the first axial direction, and the second accelerometer being configured to detect and output the acceleration value in the second axial direction, the first axial direction being perpendicular to the second axial direction.

According to various embodiments of the present disclosure, it should be understood that, the disclosed methods, apparatuses and systems may be implemented in other ways. For example, the devices described in the above embodiments are only exemplary. For example, the division of modules or units may be performed based on logical functions. Practically, the modules or units may be divided by other means. For example, the units or components may be combined or integrated into another system, or some features may be omitted, or not implemented. As another aspect, the coupling, the direct coupling or the communicative connection as shown or discussed may be an indirect coupling or communicative connection through some interfaces, some devices or units, which may be electrical, mechanical or by other means.

The units illustrated as separated components may or may not be physically separated. The component displayed as a unit may or may not be a physical unit. That is, the component may be located in one location, or distributed to network units. Some or all of the units may be selected according to practical needs to achieve the purpose of the present disclosure.

In addition, each functional unit in the various embodiments of the present disclosure may be integrated in one single processing unit, or each unit may be physically configured separately. Alternatively, two or more units may be integrated in a single unit. The above integrated units may be implemented either in the form of hardware or in the form of software functional units.

The integrated unit may be stored in a computer readable storage medium when implemented as a software functional unit and sold or used as a separate product. In this way, the essence of the technical solution of the present disclosure, or a part or all of the technical solution of the present disclosure that essentially contributes to the art, may be presented in the form of a software product. The software product may be stored in a storage medium and may include a plurality of instructions to cause a computer device (which may be a personal computer, a server, or a network device, etc.) or a processor to perform all or some of the operations of the methods of each embodiment of the present disclosure. The above-mentioned storage media may include various media that may store program codes, such as a USB drive, a portable hard drive, a Read-Only Memory (ROM), a Random Access Memory (RAM), a magnetic disk or an optical disk.

It is to be understood that, unless specified, the terms "at rest" may refer to "a first stationary state" and/or "a second stationary state" depending on context.

What is claimed is:

1. A method for monitoring a motion status of a vehicle, comprising:
obtaining N acceleration values in a first axial direction collected from N times sampling within a preset time period through an accelerometer mounted on a wheel; and obtaining a maximum acceleration change value in the first axial direction based on the N acceleration values in the first axial direction;
obtaining N acceleration values in a second axial direction collected from N times sampling within the preset time period through the accelerometer mounted on the wheel; and obtaining a maximum acceleration change value in the second axial direction based on the N acceleration values in the second axial direction; wherein the first axial direction is perpendicular to the second axial direction;
determining whether the vehicle is in motion or in a first stationary state based on the N acceleration values in the first axial direction and the N acceleration values in the second axial direction; and
in response to the vehicle being determined to be in the first stationary state, further determining whether the vehicle is in motion or in a second stationary state based on the maximum acceleration change value in the first axial direction and the maximum acceleration change value in the second axial direction;
in response to the vehicle being determined to be in the second stationary state, adjusting a tire pressure monitoring system to a sleep mode.

2. The method according to claim 1, wherein the determining whether the vehicle is in motion or in the second stationary state based on the maximum acceleration change value in the first axial direction and the maximum acceleration change value in the second axial direction comprises:
determining whether the maximum acceleration change value in the first axial direction is less than a first preset threshold and the maximum acceleration change value in the second axial direction is less than a first preset threshold;
in response to the maximum acceleration change value in the first axial direction being less than the first preset threshold and the maximum acceleration change value in the second axial direction being less than the first preset threshold, determining that the vehicle is in the second stationary state; and
in response to the maximum acceleration change value in the first axial direction being not less than the first preset threshold and/or the maximum acceleration change value in the second axial direction being not less than the first preset threshold, determining that the vehicle is in motion.

3. The method according to claim 1, wherein the obtaining the maximum acceleration change value in the first axial direction and the obtaining the maximum acceleration change value in the second axial direction comprise:
sampling an acceleration value in the first axial direction and an acceleration value in the second axial direction of the accelerometer N times respectively within the preset time period through the accelerometer to obtain the N acceleration values in the first axial direction and to obtain the N acceleration values in the second axial direction; and
obtaining the maximum acceleration change value in the first axial direction of the accelerometer based on maximum and minimum values of the N acceleration values in the first axial direction, and obtaining the maximum acceleration change value in the second axial direction of the accelerometer based on maximum and minimum values of the N acceleration values in the second axial direction.

4. The method according to claim 1, wherein the obtaining the N acceleration values in the first axial direction collected from N times sampling within the preset time period through the accelerometer mounted on the wheel; the obtaining the maximum acceleration change value in the first axial direction based on the N acceleration values in the first axial direction; the obtaining the N acceleration values in the second axial direction collected from N times sampling within the preset time period through the accelerometer mounted on the wheel; obtaining the maximum acceleration change value in the second axial direction based on the N acceleration values in the second axial direction; wherein the first axial direction is perpendicular to the second axial direction; the determining whether the vehicle is in motion or in the first stationary state based on the N acceleration values in the first axial direction and the N acceleration values in the second axial direction; and in response to the vehicle being determined to be in the first stationary state, the determining whether the vehicle is in motion or in the second stationary state based on the maximum acceleration change value in the first axial direction and the maximum acceleration change value in the second axial direction comprise:

sampling the acceleration value in the first axial direction and the acceleration value in the second axial direction of the accelerometer for an Mth time to obtain an Mth acceleration value in the first axial direction and an Mth acceleration value in the second axial direction; wherein M is less than N;

determining whether an absolute value of the Mth acceleration value in the first axial direction is less than a second preset threshold and an absolute value of the Mth acceleration value in the second axial direction is less than a second preset threshold;

in response to the absolute value of the Mth acceleration value in the first axial direction being not less than the second preset threshold and/or the absolute value of the Mth acceleration value in the second axial direction being not less than the second preset threshold, stopping sampling and determining the vehicle to be in motion;

in response to the absolute value of the Mth acceleration value in the first axial direction being less than the second preset threshold and/or the absolute value of the Mth acceleration value in the second axial direction being less than the second preset threshold, sampling the acceleration value in the first axial direction and the acceleration value in the second axial direction of the accelerometer again for an M+1th time to obtain an M+1th acceleration value in the first axial direction and an M+1th acceleration value in the second axial direction; and in response to be the sampling being performed for an Nth time and an absolute value of an Nth acceleration value in the first axial direction and an absolute value of an Nth acceleration value in the second axial direction being still both less than the second preset threshold, stopping the sampling and performing the determining whether the vehicle is in motion or in the second stationary state based on the maximum acceleration change value in the first axial direction and the maximum acceleration change value in the second axial direction.

5. The method according to claim 4, wherein the first preset threshold is equal to or greater than 0.8 g and/or the second preset threshold is equal to or greater than 6.5 g.

6. The method according to claim 3, wherein a time interval between any two adjacent samplings may be same or different.

7. The method according to claim 1, wherein the N acceleration values in the first axial direction and the N acceleration values in the second axial direction are stored by means of cyclic overwriting; wherein the cyclic overwriting is N acceleration values in the first axial direction and N acceleration values in the second axial direction in a next sampling cycle overwriting the N acceleration values in the first axial direction and the N acceleration values in the second axial direction in a current sampling cycle.

8. A tire pressure monitoring chip, comprising:
a pressure sensor, configured to detect and obtain pressure data of a tire on a wheel;
an accelerometer, configured to output an acceleration value in a first axial direction and an acceleration value in a second axial direction with a movement of the vehicle;
a radio frequency transmitter, configured to send the pressure data to a vehicle processor;
a controller, coupled to the pressure sensor, the accelerometer and the radio frequency transmitter respectively and configured to perform:
obtaining N acceleration values in a first axial direction collected from N times sampling within a preset time period through an accelerometer mounted on a wheel; and obtaining a maximum acceleration change value in the first axial direction based on the N acceleration values in the first axial direction;
obtaining N acceleration values in a second axial direction collected from N times sampling within the preset time period through the accelerometer mounted on the wheel; and obtaining a maximum acceleration change value in the second axial direction based on the N acceleration values in the second axial direction; wherein the first axial direction is perpendicular to the second axial direction;
determining whether the vehicle is in motion or in a first stationary state based on the N acceleration values in the first axial direction and the N acceleration values in the second axial direction; and
in response to the vehicle being determined to be in the first stationary state, further determining whether the vehicle is in motion or in a second stationary state based on the maximum acceleration change value in the first axial direction and the maximum acceleration change value in the second axial direction;
in response to the vehicle being determined to be in the second stationary state, adjusting a tire pressure monitoring system to a sleep mode.

9. The tire pressure monitoring chip according to claim 8, wherein the determining whether the vehicle is in motion or in the second stationary state based on the maximum acceleration change value in the first axial direction and the maximum acceleration change value in the second axial direction comprises:
determining whether the maximum acceleration change value in the first axial direction is less than a first preset threshold and the maximum acceleration change value in the second axial direction is less than a first preset threshold;
in response to the maximum acceleration change value in the first axial direction being less than the first preset threshold and the maximum acceleration change value in the second axial direction being less than the first preset threshold, determining that the vehicle is in the second stationary state; and
in response to the maximum acceleration change value in the first axial direction being not less than the first preset threshold and/or the maximum acceleration change value in the second axial direction being not less than the first preset threshold, determining that the vehicle is in motion.

10. The tire pressure monitoring chip according to claim 8, wherein the obtaining the maximum acceleration change value in the first axial direction and the obtaining the maximum acceleration change value in the second axial direction comprise:
sampling an acceleration value in the first axial direction and an acceleration value in the second axial direction of the accelerometer N times respectively within the preset time period through the accelerometer to obtain the N acceleration values in the first axial direction and to obtain the N acceleration values in the second axial direction; and
obtaining the maximum acceleration change value in the first axial direction of the accelerometer based on maximum and minimum values of the N acceleration values in the first axial direction, and obtaining the maximum acceleration change value in the second axial direction of the accelerometer based on maximum and minimum values of the N acceleration values in the second axial direction.

11. The tire pressure monitoring chip according to claim 8, wherein the obtaining the N acceleration values in the first axial direction collected from N times sampling within the preset time period through the accelerometer mounted on the wheel; the obtaining the maximum acceleration change value in the first axial direction based on the N acceleration values in the first axial direction; the obtaining the N acceleration values in the second axial direction collected from N times sampling within the preset time period through the accelerometer mounted on the wheel; obtaining the maximum acceleration change value in the second axial direction based on the N acceleration values in the second axial direction; wherein the first axial direction is perpendicular to the second axial direction; the determining whether the vehicle is in motion or in the first stationary state based on the N acceleration values in the first axial direction and the N acceleration values in the second axial direction; and in response to the vehicle being determined to be in the first stationary state, the determining whether the vehicle is in motion or in the second stationary state based on the maximum acceleration change value in the first axial direction and the maximum acceleration change value in the second axial direction comprise:
sampling the acceleration value in the first axial direction and the acceleration value in the second axial direction of the accelerometer for an Mth time to obtain an Mth acceleration value in the first axial direction and an Mth acceleration value in the second axial direction; wherein M is less than N;
determining whether an absolute value of the Mth acceleration value in the first axial direction is less than a second preset threshold and an absolute value of the Mth acceleration value in the second axial direction is less than a second preset threshold;
in response to the absolute value of the Mth acceleration value in the first axial direction being not less than the second preset threshold and/or the absolute value of the Mth acceleration value in the second axial direction being not less than the second preset threshold, stopping sampling and determining the vehicle to be in motion;
in response to the absolute value of the Mth acceleration value in the first axial direction being less than the second preset threshold and/or the absolute value of the Mth acceleration value in the second axial direction being less than the second preset threshold, sampling the acceleration value in the first axial direction and the acceleration value in the second axial direction of the accelerometer again for an M+1th time to obtain an M+1th acceleration value in the first axial direction and an M+1th acceleration value in the second axial direction; and
in response to be the sampling being performed for an Nth time and an absolute value of an Nth acceleration value in the first axial direction and an absolute value of an Nth acceleration value in the second axial direction being still both less than the second preset threshold, stopping the sampling and performing the determining whether the vehicle is in motion or in the second stationary state based on the maximum acceleration change value in the first axial direction and the maximum acceleration change value in the second axial direction.

12. The tire pressure monitoring chip according to claim 11, wherein the first preset threshold is equal to or greater than 0.8 g; and/or, the second preset threshold is equal to or greater than 6.5 g.

13. The tire pressure monitoring chip according to claim 10, wherein a time interval between any two adjacent samplings may be same or different.

14. The tire pressure monitoring chip according to claim 8, wherein the acceleration values in the first axial direction and the acceleration values in the second axial direction are stored by means of cyclic overwriting; wherein the cyclic overwriting is N acceleration values in the first axial direction and N acceleration values in the second axial direction in a next sampling cycle overwriting the N acceleration values in the first axial direction and the N acceleration values in the second axial direction in a current sampling cycle.

15. A system for monitoring a motion status of a vehicle comprising an accelerometer and a processor coupled to each other;
wherein the accelerometer is configured to detect an acceleration value in a first axial direction and an acceleration value in a second axial direction of a tire of the vehicle, the first axial direction being perpendicular to the second axial direction;
the processor is configured to perform:
obtaining N acceleration values in a first axial direction collected from N times sampling within a preset time period through an accelerometer mounted on a wheel; and obtaining a maximum acceleration change value in the first axial direction based on the N acceleration values in the first axial direction;
obtaining N acceleration values in a second axial direction collected from N times sampling within the preset time period through the accelerometer mounted on the wheel; and obtaining a maximum acceleration change value in the second axial direction based on the N acceleration values in the second axial direction; wherein the first axial direction is perpendicular to the second axial direction;
determining whether the vehicle is in motion or in a first stationary state based on the N acceleration values in the first axial direction and the N acceleration values in the second axial direction; and
in response to the vehicle being determined to be in the first stationary state, further determining whether the vehicle is in motion or in a second stationary state based on the maximum acceleration change value in the first axial direction and the maximum acceleration change value in the second axial direction;

in response to the vehicle being determined to be in the second stationary state, adjusting a tire pressure monitoring system to a sleep mode.

16. The system according to claim 15, wherein the determining whether the vehicle is in motion or in the second stationary state based on the maximum acceleration change value in the first axial direction and the maximum acceleration change value in the second axial direction comprises:

determining whether the maximum acceleration change value in the first axial direction is less than a first preset threshold and the maximum acceleration change value in the second axial direction is less than a first preset threshold;

in response to the maximum acceleration change value in the first axial direction being less than the first preset threshold and the maximum acceleration change value in the second axial direction being less than the first preset threshold, determining that the vehicle is in the second stationary state; and in response to the maximum acceleration change value in the first axial direction being not less than the first preset threshold and/or the maximum acceleration change value in the second axial direction being not less than the first preset threshold, determining that the vehicle is in motion.

17. The system according to claim 15, wherein the obtaining the maximum acceleration change value in the first axial direction and the obtaining the maximum acceleration change value in the second axial direction comprise:

sampling an acceleration value in the first axial direction and an acceleration value in the second axial direction of the accelerometer N times respectively within the preset time period through the accelerometer to obtain the N acceleration values in the first axial direction and to obtain the N acceleration values in the second axial direction; and obtaining the maximum acceleration change value in the first axial direction of the accelerometer based on maximum and minimum values of the N acceleration values in the first axial direction, and obtaining the maximum acceleration change value in the second axial direction of the accelerometer based on maximum and minimum values of the N acceleration values in the second axial direction.

18. The system according to claim 15, wherein the obtaining the N acceleration values in the first axial direction collected from N times sampling within the preset time period through the accelerometer mounted on the wheel; the obtaining the maximum acceleration change value in the first axial direction based on the N acceleration values in the first axial direction; the obtaining the N acceleration values in the second axial direction collected from N times sampling within the preset time period through the accelerometer mounted on the wheel; obtaining the maximum acceleration change value in the second axial direction based on the N acceleration values in the second axial direction; wherein the first axial direction is perpendicular to the second axial direction; the determining whether the vehicle is in motion or in the first stationary state based on the N acceleration values in the first axial direction and the N acceleration values in the second axial direction; and in response to the vehicle being determined to be in the first stationary state, the determining whether the vehicle is in motion or in the second stationary state based on the maximum acceleration change value in the first axial direction and the maximum acceleration change value in the second axial direction comprise:

sampling the acceleration value in the first axial direction and the acceleration value in the second axial direction of the accelerometer for an Mth time to obtain an Mth acceleration value in the first axial direction and an Mth acceleration value in the second axial direction; wherein M is less than N;

determining whether an absolute value of the Mth acceleration value in the first axial direction is less than a second preset threshold and an absolute value of the Mth acceleration value in the second axial direction is less than a second preset threshold;

in response to the absolute value of the Mth acceleration value in the first axial direction being not less than the second preset threshold and/or the absolute value of the Mth acceleration value in the second axial direction being not less than the second preset threshold, stopping sampling and determining the vehicle to be in motion;

in response to the absolute value of the Mth acceleration value in the first axial direction being less than the second preset threshold and/or the absolute value of the Mth acceleration value in the second axial direction being less than the second preset threshold, sampling the acceleration value in the first axial direction and the acceleration value in the second axial direction of the accelerometer again for an M+1th time to obtain an M+1th acceleration value in the first axial direction and an M+1th acceleration value in the second axial direction; and in response to be the sampling being performed for an Nth time and an absolute value of an Nth acceleration value in the first axial direction and an absolute value of an Nth acceleration value in the second axial direction being still both less than the second preset threshold, stopping the sampling and performing the determining whether the vehicle is in motion or in the second stationary state based on the maximum acceleration change value in the first axial direction and the maximum acceleration change value in the second axial direction.

19. The system according to claim 18, wherein the first preset threshold is equal to or greater than 0.8 g and/or the second preset threshold is equal to or greater than 6.5 g.

20. The system according to claim 17, wherein a time interval between any two adjacent samplings may be same or different.

* * * * *